(12) United States Patent
DePuydt et al.

(10) Patent No.: US 8,137,782 B2
(45) Date of Patent: Mar. 20, 2012

(54) OPTICAL MEDIA MANUFACTURED WITH LOW-GRADE MATERIALS

(75) Inventors: James M. DePuydt, Woodbury, MN (US); Eric D. Levinson, Woodbury, MN (US); Ramnath Subramaniam, Woodbury, MN (US)

(73) Assignee: Imation Corp., Oakdale, MN (US)

( * ) Notice: Subject to any disclaimer, the term of this patent is extended or adjusted under 35 U.S.C. 154(b) by 688 days.

(21) Appl. No.: 12/290,064

(22) Filed: Oct. 27, 2008

(65) Prior Publication Data

US 2010/0103808 A1 Apr. 29, 2010

(51) Int. Cl.
*B32B 3/02* (2006.01)
(52) U.S. Cl. .................. 428/64.1; 428/64.4; 430/270.11
(58) Field of Classification Search .................. 428/64.4
See application file for complete search history.

(56) References Cited

U.S. PATENT DOCUMENTS

| | | | |
|---|---|---|---|
| 7,389,520 | B2 | 6/2008 | Hayashi et al. |
| 2004/0170116 | A1 | 9/2004 | Moloo et al. |
| 2004/0228262 | A1 | 11/2004 | Bigley |
| 2005/0018583 | A1 | 1/2005 | Worthington et al. |
| 2005/0018589 | A1 | 1/2005 | Mizushima et al. |
| 2005/0169147 | A1 | 8/2005 | Kobayashi et al. |
| 2007/0224384 | A1* | 9/2007 | Jeong et al. ................... 428/64.4 |
| 2007/0269670 | A1* | 11/2007 | Wilmer et al. ................ 428/500 |
| 2010/0142360 | A1* | 6/2010 | Town .......................... 369/275.1 |

FOREIGN PATENT DOCUMENTS

| | | |
|---|---|---|
| CN | 2550876 | 5/2003 |
| CN | 178326 A | 6/2006 |
| IN | 140/DEL/2007 | 8/2008 |
| IN | 141/DEL/2007 | 8/2008 |
| JP | 61-214245 | 9/1986 |
| JP | 2-141946 | 5/1990 |
| JP | 9-320109 | 12/1997 |

* cited by examiner

*Primary Examiner* — Elizabeth Mulvaney
(74) *Attorney, Agent, or Firm* — Shumaker & Sieffert, P.A.

(57) ABSTRACT

This disclosure describes optical media that is compatible with conventional DVD drives. Unlike conventional DVDs, however, the described media uses a lower cost, lower quality material for one of the substrates. In particular, a so-called "dummy" substrate may comprise a non-optical grade polymeric material. In some cases, the dummy substrate may include post-consumer recycled materials, such as recycled polycarbonate. In other cases, dummy substrate may comprise a low cost non-optical grade polycarbonate, such as an industrial grade polycarbonate. In still other cases, the dummy substrate may comprise a polycarbonate blend, or other non-polycarbonate materials.

34 Claims, 4 Drawing Sheets

US 8,137,782 B2

OPTICAL MEDIA MANUFACTURED WITH LOW-GRADE MATERIALS

TECHNICAL FIELD

This disclosure relates to optical data storage media and, more particularly, digital versatile disks (DVDs).

BACKGROUND

Optical data storage disks have gained widespread acceptance for the storage, distribution and retrieval of large volumes of information. Optical data storage disks include, for example, audio CD (compact disc), CD-R (CD-recordable), CD-RW (CD-rewritable) CD-ROM (CD-read only memory), DVD (digital versatile disk), DVD-R, DVD-RW, DVD-ROM, DVD-RAM (DVD-random access memory), HD-DVD (high definition-DVD), Blu-ray, and various other types of writable or rewriteable media, such as magneto-optical (MO) disks, phase change optical disks, and others.

Optical data storage disks are typically produced by first making a data storage disk master that has a surface pattern that represents encoded data and/or precision tracking features on the master surface. The surface pattern on the master disk, for instance, may be a collection of precisely dimensioned grooves or other features that define master pits and master lands, e.g., typically arranged in either a spiral or concentric manner. The master is typically not suitable as a mass replication surface, as the master features are typically defined within an etched photoresist layer formed over a master substrate.

After creating a suitable master, that master can be used to make a stamper, which is less fragile than the master. The stamper is typically formed of electroplated metal or a hard plastic material, and has a surface pattern that is the inverse of the surface pattern encoded on the master. An injection mold can use the stamper to fabricate large quantities of thermoplastic replica disk substrates. Also, photo-polymerization replication processes, such as rolling bead processes, have been used to fabricate replica disk substrates using stampers. In any case, each replica disk substrate may contain the data and tracking precision that was originally encoded on the master surface and preserved in the stamper. The replica disk substrates can be coated with other materials, such as dyes, phase change materials, and/or reflectors to form the optical disks.

Some types of optical data storage disks contain multiple substrates that are bonded together. For example, DVD, DVD-ROM, DVD-R, DVD-RW, and HD-DVD media constructions conventionally include two substrates, both having a thickness of approximately 0.6 millimeters.

SUMMARY

In general, this disclosure describes optical media that is compatible with conventional digital versatile disk (DVD) drives. Unlike conventional DVDs, however, the described media uses a lower cost, lower quality material for one of the substrates, i.e., a non-optical grade substrate. As described herein, the non-optical grade substrate refers to a substrate that does not comprise optical grade polycarbonate because light does not need to pass through the non-optical grade substrate. This non-optical grade substrate may be referred to as a "dummy" substrate.

In particular, the so-called "dummy" substrate may comprise a non-optical grade polymeric material. In some cases, the dummy substrate may include recycled materials, such as recycled polycarbonate. In other cases, dummy substrate may comprise a low cost non-optical grade polycarbonate, such as an industrial grade polycarbonate. In still other cases, the dummy substrate may comprise a polycarbonate blend, or other non-polycarbonate materials. The optical properties of the dummy substrate may be non-compliant with one or more optical specifications of the DVD, but this does not matter insofar as light does not need to pass through the dummy substrate during data writing or reading operations.

In one embodiment, this disclosure provides an optical data storage medium compatible with a DVD drive, the medium comprising a first disk-shaped substrate comprising an optical grade thermoplastic material, the first disk-shaped substrate defining a first side and a second side, wherein the first side defines a data surface, wherein a laser of the DVD drive reads information associated with the data surface by interrogating light through the first disk-shaped substrate, and a second disk-shaped substrate defining a first side and a second side, wherein the second side of the second disk-shaped substrate is bonded to the first side of the first disk-shaped substrate, and wherein the second disk-shaped substrate comprises a non-optical grade thermoplastic material.

In another embodiment, this disclosure provides an optical data storage medium compatible with a DVD drive, the medium comprising a first disk-shaped substrate comprising an optical grade thermoplastic material, the first disk-shaped substrate defining a first side and a second side, and a second disk-shaped substrate defining a first side and a second side, wherein the second side of the second disk-shaped substrate is bonded to the first side of the first disk-shaped substrate, wherein the second side of the second disk-shaped substrate defines a data surface and wherein a laser of the DVD drive reads information associated with the data surface by interrogating light through the first disk-shaped substrate, and wherein the second disk-shaped substrate comprises a non-optical grade thermoplastic material.

In an added embodiment, this disclosure describes an optical data storage medium compatible with a Blu-ray standard, the medium comprising a substrate defining a first side and a second side, wherein the first side defines a data surface, and wherein the substrate comprises post-consumer recycled material, and a cover layer formed over the data surface.

The details of one or more embodiments of this disclosure are set forth in the accompanying drawings and the description below. Other features, objects, and advantages of the media described in this disclosure will be apparent from the description and drawings, and from the claims.

DETAILED DESCRIPTION

Figure 1:
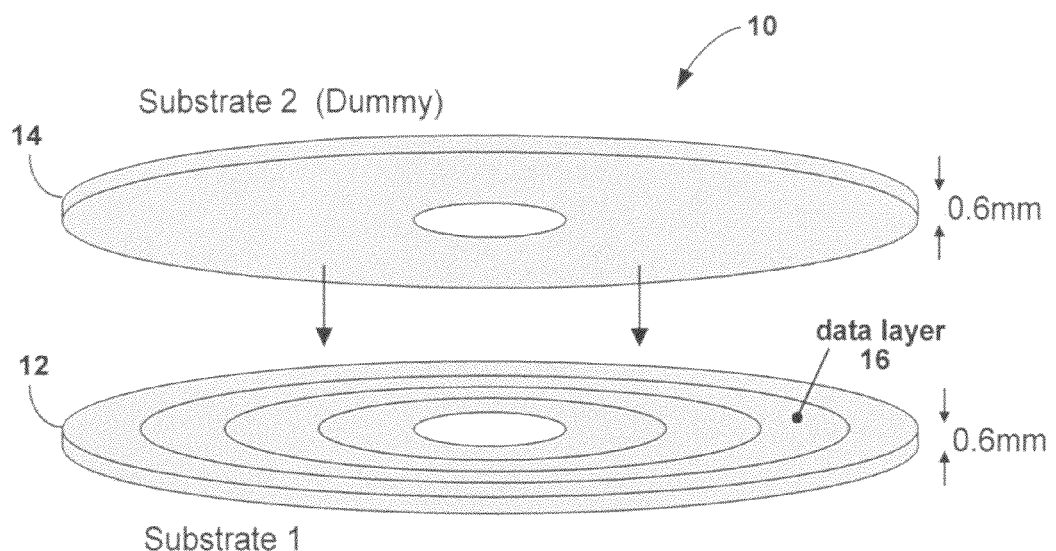
FIG. 1 is a perspective exploded view of an exemplary optical data storage disk medium consistent with this disclosure.

This disclosure describes optical data storage media that is compatible with conventional DVD drives. In this disclosure, the acronym "DVD" refers to a digital versatile disk, such as DVD, DVD-R, DVD-RW, DVD-ROM and HD-DVD. DVDs are also sometimes called "digital video disks," particularly when the disks are used to store video information, such as motion pictures. The optical media described in this disclosure are in many ways compliant with DVD standard specifications.

DVD media may include two substrates, both having a thickness of approximately 0.6 millimeters. One of the substrates bears the data and/or tracking information, while the other non-information bearing substrate provides the functions of backside protection, reference clamping area, a labeling area, and improved mechanical stability. In these types of bonded media constructions, the information-bearing surface of one of the substrates is sandwiched between two substrates. As such, the information bearing surface is interrogated by a drive system using a beam of laser light that is brought to focus through the information bearing substrate. This, in turn, places strict optical requirements for thickness, thickness uniformity, index of refraction, and birefringence for the information-bearing substrate.

The non-information bearing substrate may be referred to as a "dummy" substrate. This "dummy" substrate may provide backside protection insofar as the information bearing surface is encased between the two bonded substrates. In addition, the non-information bearing substrate also functions to improve robustness of the medium by improving both the dynamic and static mechanical stability. A bonded non-information bearing substrate improves static mechanical stability by minimizing bending stress to the information-bearing surface. Likewise, a properly bonded non-information bearing substrate improves dynamic mechanical runout for the rotating media.

With DVD media constructions (such as DVD, DVD-ROM, DVD-R, DVD-RW, and HD-DVD), the data layer is located approximately 0.6 millimeters in from the surface of the disk closest to the laser. During reading and recording, the laser beam passes through the portion of the disk located between the laser and the data layer. This portion of the disk, the optically functional portion, must adhere to specified requirements in regard to optical thickness, optical thickness uniformity, allowable thickness range, allowable birefringence, and range of optical index of refraction for the material.

Unlike conventional DVDs, the optical data storage media described herein uses non-conventional materials for the "dummy" substrate. Conventional DVDs include two substrates that are bonded together. Moreover, conventionally, both of the two substrates comprise optical grade polycarbonate.

In accordance with this disclosure, however, one of the substrates may be formed of a non-optical grade polymer material in order to reduce costs associated with the optical data storage media. A first substrate may comprise optical grade polycarbonate, and data recording or readout to the disk may pass light through the first substrate. The second substrate, however, may comprise a lower cost material, such as non-optical grade (or industrial grade) polycarbonate.

The materials that may be used for the "dummy" substrate include recycled material, such as post-consumer recycled polycarbonate obtained from old optical data storage disks, or recycled polycarbonate obtained from another source. Alternatively, acrylonitrile butadiene styrene (ABS), polyethylene teraphthalante (PET), polybutylene terephthalate (PBT), another type of polyester, blends of ABS and polycarbonate, blends of PET and polycarbonate, blends of PBT and polycarbonate, or blends of polycarbonate and other polyester may be used for the dummy substrate. ABS is sometimes referred to as an ABS copolymer. In some cases, some or all of the materials or material blends of the dummy substrate may comprise post-consumer recycled material, which leads to a more environmentally friendly optical data storage medium One of the substrates may include replicated features, data layers such as phase change materials or dyes, reflectors, or other types of materials to facilitate information storage and retrieval. These features may be replicated and deposited on either first or the second substrate, e.g., at the bonding interface of the two substrates. In either case, the information recording and readout occurs by passing light through the optical grade substrate to access the information layer that is formed on one of the substrates at the bonded interface.

In many cases, both of the substrates define substantially flat profiles and thicknesses of approximately 0.6 millimeters. In such cases, the thickness of the DVD may be approximately 1.2 millimeters. In some cases, however, the second substrate that uses non-optical grade materials may define a non-conventional profile. For example, the second substrate that uses non-optical grade materials may define a non-flat profile. In such cases, the non-flat profile may reduce the amount of raw materials needed for the second substrate, further reducing raw material costs. Furthermore, the non-flat profile may be defined so as to create a stress balance of mechanical stress at the bonded surface of the two substrates. Other quantities, such as water absorption, elastic modulus, and tension, may also be balanced at the interface of the two substrates by defining different thickness profiles of the two substrates.

The mechanical and thermal properties of the dummy substrate may be important in order to maintain flatness of the DVD as the disc experiences changes in temperature or humidity. It is desirable, therefore, that dummy substrate have similar mechanical and thermal characteristics as those of the first substrate.

DVD's are typically manufactured by bonding two 0.6 mm substrates together to form a 1.2 mm thick disc. The data layer typically resides on the inner surface of one of the substrates. The data layer can consist of molded-in pits with a reflector as in the case of a DVD-ROM. Alternatively, the data layer can be a molded-in pre-groove with a dye and reflector as in the case of a DVD-R disc, or it can be a molded-in pre-groove with a phase change material as in the case of a DVD-RW disc.

In one implementation, only one substrate (e.g., the one containing the data) is molded using optical grade polycarbonate. The other "dummy" substrate is molded from lower grade polycarbonate-like industrial-grade or recycled polycarbonate, or another non-optical grade material described herein.

FIG. 1 is an exploded perspective view of an exemplary optical data storage medium 10 consistent with this disclosure. Medium 10 may be readable by a conventional DVD drive. As shown, medium 10 comprises a first substrate 12 and a second substrate 14 that are bonded together. A first side of first substrate 12 defines a data layer 16. Data layer 16 may comprise replicated features formed on the surface of first substrate 12, e.g., a collection of pits and grooves formed in a concentric or spiral pattern. Data layer 16 may also comprise one or more deposited materials, such as reflectors, phase change materials, dyes, or other information layers commonly used in optical disc media constructions.

The first side of first substrate 12 is bonded to a second side of second substrate 14. Generally, in FIG. 1 and the other figures addressed below, the "first side" refers to the top side shown in the illustrations, whereas the "second side" refers to the bottom side shown in the illustrations. In FIG. 1, first and second substrates 12 and 14 may each define substantially flat 0.6 millimeter thick substrates.

In accordance with this disclosure, first substrate 12 may comprise a conventional optical grade polycarbonate substrate. In contrast, second substrate 14 may comprise a non-conventional non-optical grade polymer to reduce the overall costs associated with medium 10.

In one example, second substrate 14 may comprise industrial grade polycarbonate. In another example, second substrate 14 may comprise post-consumer recycled material, such as recycled polycarbonate obtained from old optical data storage disks, or recycled polycarbonate obtained from another source. In another example, second substrate 14 may comprise acrylonitrile butadiene styrene (ABS), polyethylene teraphthalante (PET), polybutylene terephthalate (PBT), another type of polyester, blends of ABS and polycarbonate, blends of PET and polycarbonate, blends of PBT and polycarbonate, or blends of polycarbonate and other polyester. In some cases, some or all of the materials or material blends may comprise post-consumer recycled material, which leads to a more environmentally friendly optical data storage medium.

Various characteristics of second substrate 14 may be aligned or matched with those of first substrate 12. For example, a coefficient of thermal expansion of second substrate 14 may be within approximately 15 percent, within approximately 10 percent, within approximately 5 percent or within approximately 2 percent of a coefficient of thermal expansion of first substrate 12. Also, water permeability of second substrate 14 may be within approximately 15 percent, within approximately 10 percent, within approximately 5 percent or within approximately 2 percent of the water permeability of first substrate 12. In addition, the tensile modulus, flexure modulus, and/or Young's modulus of second substrate 14 may be within approximately 15 percent, within approximately 10 percent, within approximately 5 percent or within approximately 2 percent of that of first substrate 12.

Figure 2:
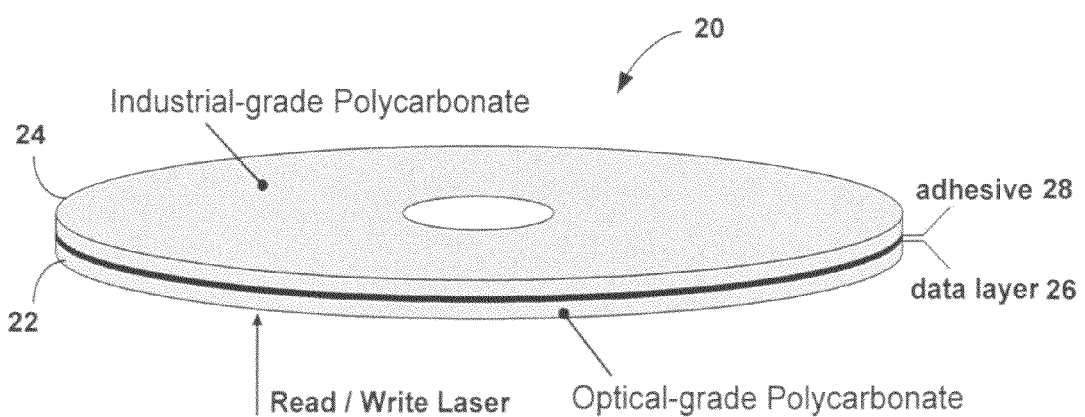
FIG. 2 is a perspective view of an exemplary optical data storage disk medium consistent with this disclosure.

FIG. 2 is a perspective view of an exemplary optical data storage medium 20 consistent with this disclosure. Medium 20 may be readable by a conventional DVD drive. As shown, medium 20 comprises a first substrate 22 and a second substrate 24 that are bonded together. A data layer 26 is formed on the first side of first substrate 22. Data layer 26 may comprise replicated features formed on the surface of first substrate 22, e.g., a collection of pits and grooves formed in a concentric or spiral pattern. Data layer 26 may also comprise one or more deposited materials, such as reflectors, phase change materials, dyes, or other information layers commonly used in optical disc media constructions. An adhesive 28 bonds first substrate 22 to second substrate 24

As with optical medium 10, optical medium 20 may comprise a conventional optical grade polycarbonate substrate as first substrate 22. In contrast, second substrate 24 may comprise a non-conventional non-optical grade polymer, such as industrial grade polycarbonate, as illustrated, to reduce the overall costs associated with medium 20.

Second substrate 24 may comprise post-consumer recycled material, such as recycled polycarbonate obtained from old optical data storage disks, or recycled polycarbonate obtained from another source. In other examples, second substrate 24 may comprise blends of polycarbonate with other polymer materials, such as blends of ABS and polycarbonate, or blends of polyester and polycarbonate. In some cases, some or all of the materials or material blends may comprise post-consumer recycled material, which leads to a more environmentally friendly optical data storage medium Various characteristics of second substrate 24 may be aligned or matched with those of first substrate 22. For example, a coefficient of thermal expansion of second substrate 24 may be within approximately 15 percent, within approximately 10 percent, within approximately 5 percent or within approximately 2 percent of a coefficient of thermal expansion of first substrate 22. Also, water permeability of second substrate 24 may be within approximately 15 percent, within approximately 10 percent, within approximately 5 percent or within approximately 2 percent of the water permeability of first substrate 22. In addition, the tensile modulus, flexure modulus, and/or Young's modulus of second substrate 24 may be within approximately 15 percent, within approximately 10 percent, within approximately 5 percent or within approximately 2 percent of that of first substrate 22.

Figure 3:
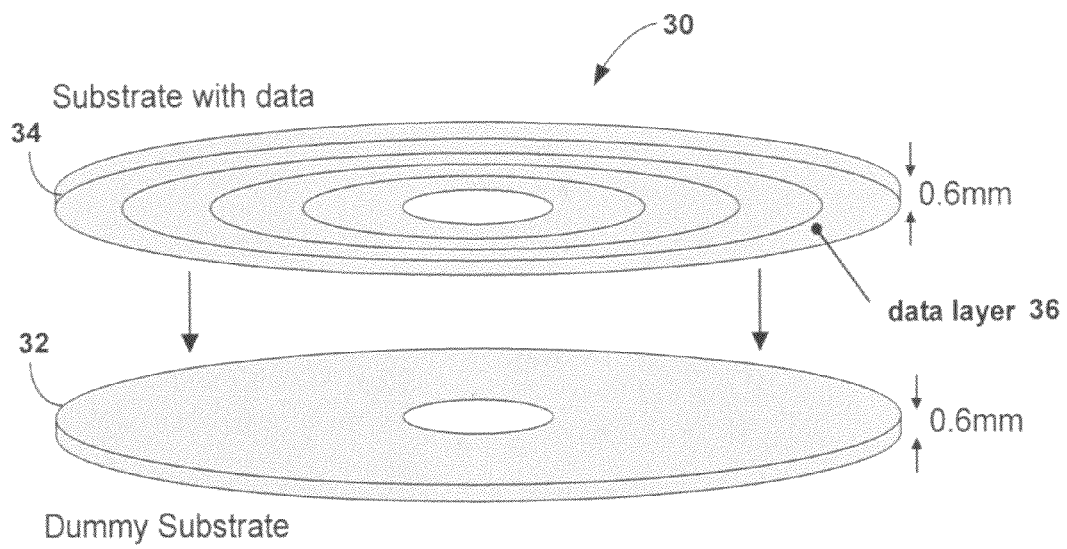
FIG. 3 is a perspective exploded view of an exemplary optical data storage disk medium consistent with this disclosure.

FIG. 3 is an exploded perspective view of an exemplary optical data storage medium 30 consistent with this disclosure. Medium 30 may be readable by a conventional DVD drive. Medium 30 is very similar to medium 10 of FIG. 1 in many respects. However, unlike medium 10, medium 30 has a reverse stack design in which the information layer is formed on the second surface of second substrate 34 rather than the first surface of first substrate 32. In other words, the non-conventional dummy substrate 34, which is formed on non-optical grade materials, may be used to define data layer 36, which is read through first substrate 32.

As shown, medium 30 comprises a first substrate 32 and a second substrate 34 that are bonded together. A second side of second substrate 34, e.g., the bottom side, defines a data layer 36. Data layer 36 may comprise replicated features formed on the surface of second substrate 34, e.g., a collection of pits and grooves formed in a concentric or spiral pattern. Data layer 36 may also comprise one or more deposited materials, such as reflectors, phase change materials, dyes, or other information layers commonly used in optical disc media constructions.

The first side of first substrate 32 is bonded to a second side of second substrate 34. In accordance with this disclosure, first substrate 32 may comprise a conventional optical grade polycarbonate substrate. In contrast, second substrate 34 may comprise a non-conventional non-optical grade polymer to reduce the overall costs associated with medium 30.

In one example, second substrate 34 may comprise industrial grade polycarbonate. In another example, second substrate 34 may comprise post-consumer recycled material, such as recycled polycarbonate obtained from old optical data storage disks, or recycled polycarbonate obtained from another source. In another example, second substrate 34 may comprise ABS, PET, PBT, blends of ABS and polycarbonate, blends of PBT and polycarbonate, or blends of PET and polycarbonate. In some cases, some or all of the materials or material blends may comprise post-consumer recycled material, which leads to a more environmentally friendly optical data storage medium Various characteristics of second substrate 34 may be aligned or matched with those of first substrate 32. For example, a coefficient of thermal expansion of second substrate 34 may be within approximately 15 percent, within approximately 10 percent, within approximately 5 percent or within approximately 2 percent of a coefficient of thermal expansion of first substrate 32. Also, water permeability of second substrate 34 may be within approximately 15 percent, within approximately 10 percent, within approximately 5 percent or within approximately 2 percent of the water permeability of first substrate 32. In addition, the tensile modulus, flexure modulus, and/or Young's modulus of second substrate 34 may be within approximately 15 percent, within approximately 10 percent, within approximately 5 percent or within approximately 2 percent of that of first substrate 32.

Figure 4:
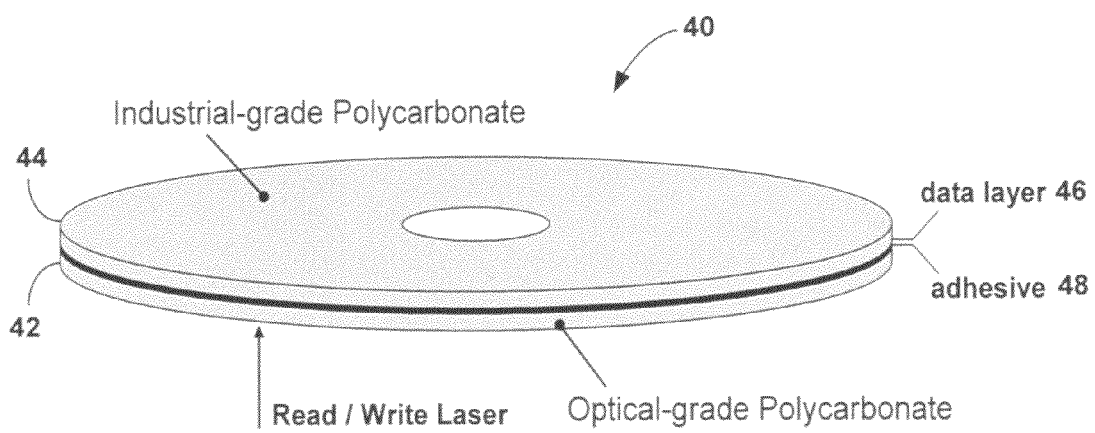
FIG. 4 is a perspective view of an exemplary optical data storage disk medium consistent with this disclosure.

FIG. 4 is a perspective view of an exemplary optical data storage medium 40 that defines a reverse stack design similar to that shown in medium 30 of FIG. 3. Medium 40 may be readable by a conventional DVD drive. As shown, medium 40 comprises a first substrate 42 and a second substrate 44 that are bonded together. A data layer 46 is formed on the second side of second substrate 44. Data layer 46 may comprise replicated features formed on the surface of second substrate 42, e.g., a collection of pits and grooves formed in a concentric or spiral pattern. Data layer 46 may also comprise one or more deposited materials, such as reflectors, phase change materials, dyes, or other information layers commonly used in optical disc media constructions. An adhesive 48 bonds first substrate 42 to second substrate 44

As with optical medium 30, optical medium 40 may comprise a conventional optical grade polycarbonate substrate as first substrate 42. In contrast, second substrate 44 may comprise a non-conventional non-optical grade polymer, such as industrial grade polycarbonate, as illustrated, to reduce the overall costs associated with medium 40.

Second substrate 44 may comprise post-consumer recycled material, such as recycled polycarbonate obtained from old optical data storage disks, or recycled polycarbonate obtained from another source. In other examples, second substrate 44 may comprise blends of polycarbonate with other polymer materials, such as blends of ABS and polycarbonate, or blends of polyester and polycarbonate. In some cases, some or all of the materials or material blends may comprise post-consumer recycled material, which leads to a more environmentally friendly optical data storage medium.

Various characteristics of second substrate 44 may be aligned or matched with those of first substrate 42. For example, a coefficient of thermal expansion of second substrate 44 may be within approximately 15 percent, within approximately 10 percent, within approximately 5 percent or within approximately 2 percent of a coefficient of thermal expansion of first substrate 42. Also, water permeability of second substrate 44 may be within approximately 15 percent, within approximately 10 percent, within approximately 5 percent or within approximately 2 percent of the water permeability of first substrate 42. In addition, the tensile modulus, flexure modulus, and/or Young's modulus of second substrate 44 may be within approximately 15 percent, within approximately 10 percent, within approximately 5 percent or within approximately 2 percent of that of first substrate 42.

The embodiments illustrated in FIGS. 1 and 2 may be more desirable relative to the embodiments illustrated in FIGS. 3 and 4 because of impurities or imperfections resulting from the use of lower grade polycarbonate (or other non-optical grade polymer) for the second substrate. In FIGS. 1 and 2, the data layer is separated from the lower grade polycarbonate (or other non-optical grade polymer) by the adhesive whereas in FIGS. 3 and 4 the data layer resides directly on the lower grade polycarbonate (or other non-optical grade polymer).

In some embodiments, the first substrate, i.e., the optical grade substrate, may have an index of refraction in a range of 1.55±0.10 (for $\lambda$=655 nm, where $\lambda$ represents the wavelength of laser), and a maximum birefringence of 100 nanometers. In other embodiments, the first substrate, i.e., the optical grade substrate, may have an index of refraction in a range of 1.55±0.10 (for $\lambda$=655 nm), and a maximum of 60 nanometers. The transmittance of the first substrate (for $\lambda$=655 nm) may be at least 90 percent for a sample that has a thickness of approximately 118 mil, which is approximately 3 millimeters thick. The second substrate need not comply with these specifications.

The important characteristics of the material used in the second substrate, i.e., the non-optical grade substrate are as follows. The material of the second substrate should have good injection molding characteristics. The material of the second substrate should have shrinkage characteristics comparable to optical grade polycarbonate used for the first substrate. The material of the second substrate should have tensile and flexural modulii comparable to the optical grade material of the first substrate. However, the thickness and profile of the second substrate may be modified to compensate for small differences in tensile and flexural modulii comparable to the optical grade material of the first substrate.

The material of the second substrate should have a coefficient of thermal expansion that is comparable to the optical grade material of the first substrate. However, the thickness and profile of the second substrate may be modified to compensate for small differences in coefficient of thermal expansion comparable to the optical grade material of the first substrate. Also, the material of the second substrate should have water absorption characteristics comparable to the optical grade material of the first substrate. However, the thickness and profile of the second substrate may be modified to compensate for small differences in water absorption comparable to the optical grade material of the first substrate.

Example characteristics of optical grade polycarbonate (commercially available polycarbonate from Teijin-Dupont) are as follows:

| | |
|---|---|
| Molding Shrinkage | .5%-.7% |
| Tensile Modulus | 341000 pounds per square inch (psi) |
| Flexural Modulus | 340000 psi |
| Coefficient of Linear Thermal Expansion (CLTE) | .000044 in/in/F. |
| Water Absorption | 0.2% (at 73 degrees Fahrenheit for 24 hours) |

One substitute material of particular interest for use in the second substrate, i.e., the non-optical grade substrate is a polycarbonate (PC)/acrylonitrile butadiene styrene (ABS) blend. PC/ABS blends have been used in certain applications to obtain properties similar to that of polycarbonate while keeping costs low by blending in the low-cost ABS. The properties of one such blend (commercially available Multilon T-3713) is as follows:

| | |
|---|---|
| Molding Shrinkage | .5%-.7% |
| Tensile Modulus | 355000 psi |
| Flexural Modulus | 341000 psi |
| CLTE | .000039 in/in/F. |
| Water Absorption | Not Available |

This material provides an excellent match to the polycarbonate listed above for shrinkage and modulus. Furthermore, the thermal expansion match is within 10 percent.

Other substitute materials of interest for use in the second substrate, i.e., the non-optical grade substrate include ABS, PC/ABS blends available from Teijin under the Multilon brand, and blends of polycarbonate and polyesters (such as PBT or PET) available from Bayer under the Makroblend brand. In addition, there are other thermoplastic blends that may be desirable.

Conventional DVDs are constructed using two 0.6 mm polycarbonate substrates bonded together. A data layer or recordable layer is contained on one side of the first 0.6 mm substrate. The second substrate (the dummy) provides mechanical rigidity, physical protection of the data layer, a reference surface in the disc clamping area and a labeling surface. Data recording and/or readback is accomplished with a laser beam that passes through the first substrate. The laser light does not pass through the dummy substrate. Since laser light does not pass through the dummy, the optical characteristics of the dummy may be irrelevant.

The mechanical and thermal properties of the dummy substrate may be important in order to maintain flatness of the DVD especially as the disc experiences changes in temperature or humidity. It is desirable, therefore, that the dummy have similar mechanical and thermal characteristics as those of the first substrate, such as thermal expansion coefficient, modulus and water permeability. If the materials properties cannot be closely matched, then one may anticipate some of these mismatches, and manage the mismatches by modifying the thickness or thickness profile of the dummy substrate.

Again, this disclosure describes a DVD in which the first substrate is molded using optical grade polycarbonate, but the dummy is molded using alternative, low-cost thermoplastic materials. Since the dummy is made from low-cost materials, the resulting manufacturing cost of the DVD will be less than that of a DVD made entirely of optical grade polycarbonate. This disclosure also contemplates thickness reductions of the dummy substrate. The reduction in thickness further reduces the cost of the disc and reduces that amount of waste introduced into the environment at the time of disposal. The thickness and thickness profile of the dummy substrate (the second substrate) may be modified to offset one or more stresses that may result from using material with mechanical properties slightly different from those of optical grade polycarbonate used for the first substrate.

Figure 5:
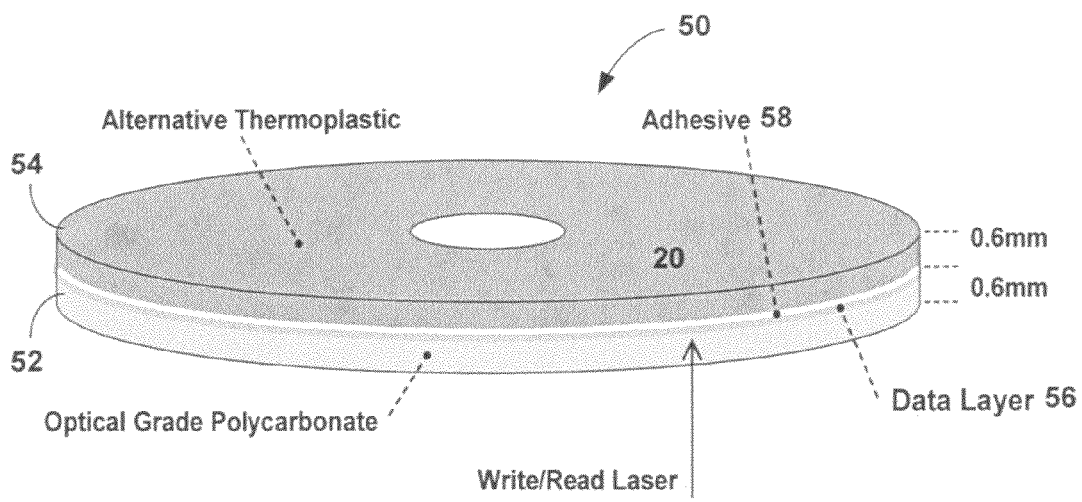
FIG. 5 is a perspective view of an exemplary optical data storage disk medium consistent with this disclosure.

FIG. 5 is a perspective view of an exemplary optical data storage medium 50 consistent with this disclosure. Medium 50 may be readable by a conventional DVD drive. As shown, medium 50 comprises a first substrate 52 and a second substrate 54 that are bonded together. A data layer 56 is formed on the first side of first substrate 52. Data layer 56 may comprise replicated features formed on the surface of first substrate 52, e.g., a collection of pits and grooves formed in a concentric or spiral pattern. Data layer 56 may also comprise one or more deposited materials, such as reflectors, phase change materials, dyes, or other information layers commonly used in optical disc media constructions. An adhesive 58 bonds first substrate 52 to second substrate 54. As shown, a read/write laser passes through first substrate 52 to interrogate data layer 56.

Optical medium 50 may comprise a conventional optical grade polycarbonate substrate as first substrate 52. In contrast, second substrate 54 may comprise an alternative thermoplastic material that may comprise a non-conventional non-optical grade polymer, such as industrial grade polycarbonate or another material discussed herein.

Second substrate 54, for example, may comprise post-consumer recycled material, such as recycled polycarbonate obtained from old optical data storage disks, or recycled polycarbonate obtained from another source. In other examples, second substrate 54 may comprise blends of polycarbonate with other polymer materials, such as blends of ABS and polycarbonate, or blends of polyester and polycarbonate. In some cases, some or all of the materials or material blends may comprise post-consumer recycled material, which leads to a more environmentally friendly optical data storage medium.

Various characteristics of second substrate 54 may be aligned or matched with those of first substrate 52. For example, a coefficient of thermal expansion of second substrate 54 may be within approximately 15 percent, within approximately 10 percent, within approximately 5 percent or within approximately 2 percent of a coefficient of thermal expansion of first substrate 52. Also, water permeability of second substrate 54 may be within approximately 15 percent, within approximately 10 percent, within approximately 5 percent or within approximately 2 percent of the water permeability of first substrate 52. In addition, the tensile modulus, flexure modulus, and/or Young's modulus of second substrate 54 may be within approximately 15 percent, within approximately 10 percent, within approximately 5 percent or within approximately 2 percent of that of first substrate 52.

Figure 6:
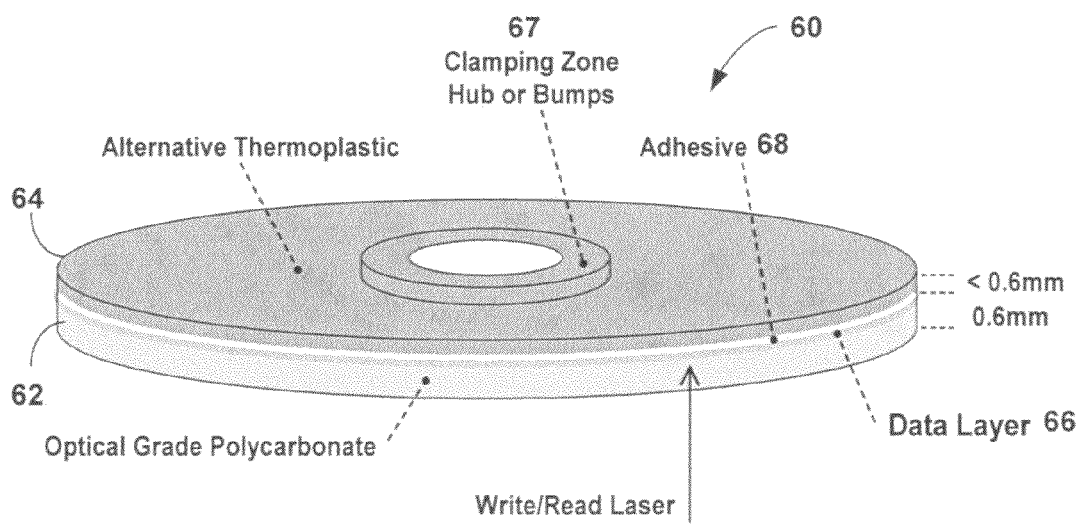
FIG. 6 is a perspective view of an exemplary optical data storage disk medium consistent with this disclosure.

FIG. 6 is a perspective view of an exemplary optical data storage medium 60 consistent with this disclosure. Medium 60 may be readable by a conventional DVD drive. As shown, medium 60 comprises a first substrate 62 and a second substrate 64 that are bonded together. A data layer 66 is formed on the first side of first substrate 62 (but could alternatively be formed on the surface of second substrate 64 in a reverse stack configuration). Data layer 66 may comprise replicated features formed on the surface of first substrate 62, e.g., a collection of pits and grooves formed in a concentric or spiral pattern. Data layer 66 may also comprise one or more deposited materials, such as reflectors, phase change materials, dyes, or other information layers commonly used in optical disc media constructions. An adhesive 68 bonds first substrate 62 to second substrate 64. As shown, a read/write laser passes through first substrate 62 to interrogate data layer 66.

In this example, second substrate 64 has a reduced thickness profile, e.g., less than 0.6 millimeters. This may provide added savings in raw materials. A clamping zone 67 is located near the inner diameter of medium 60. Clamping zone 67 may comprise a ring, a set of bumps, or other features that increase the thickness of second substrate 64 to approximately 0.6 millimeters in that specific zone in order to provide thickness compliance for DVD drives that clamp the disk at the inner diameter.

Furthermore, the reduced thickness profile of second substrate 64 may be defined to compensate for differences in tensile stress, molding shrinkage, flexure or water absorption between first substrate 62 and second substrate 64.

A conventional optical grade polycarbonate substrate may be used as first substrate 62. In contrast, second substrate 64 may comprise an alternative thermoplastic material that may comprise a non-conventional non-optical grade polymer, such as industrial grade polycarbonate or another material discussed herein. Since different materials are used for first and second substrates 62 and 64, different thickness profiles may be defined over the major surfaces of substrates 62 and 64 to compensate for imbalances in stress, shrinkage, flexure and/or water absorption. It may be desirable, for example, to make one or more of these factors align for the two different substrates to within approximately 20 percent, within approximately 10 percent, or within approximately 5 percent, and thickness changes may be used to accomplish this goal.

As with the other examples herein, second substrate 64 may comprise post-consumer recycled material, such as recycled polycarbonate obtained from old optical data storage disks, or recycled polycarbonate obtained from another source. In other examples, second substrate 64 may comprise blends of polycarbonate with other polymer materials, such as blends of ABS and polycarbonate, or blends of polyester and polycarbonate. In some cases, some or all of the materials or material blends may comprise post-consumer recycled material, which leads to a more environmentally friendly optical data storage medium.

Various characteristics of second substrate 64 may be aligned or matched with those of first substrate 62. For example, a coefficient of thermal expansion of second substrate 64 may be within approximately 15 percent, within approximately 10 percent, within approximately 5 percent or within approximately 2 percent of a coefficient of thermal expansion of first substrate 62. Also, water permeability of second substrate 64 may be within approximately 15 percent, within approximately 10 percent, within approximately 5 percent or within approximately 2 percent of the water permeability of first substrate 62. In addition, the tensile modulus, flexure modulus, and/or Young's modulus of second substrate 64 may be within approximately 15 percent, within approximately 10 percent, within approximately 5 percent or within approximately 2 percent of that of first substrate 62. Depending on the materials used for first substrate 62 and second substrate 64, the thickness profile of second substrate 64 may be defined relative to that of first substrate 62 to achieve these matching characteristics.

Figure 7:
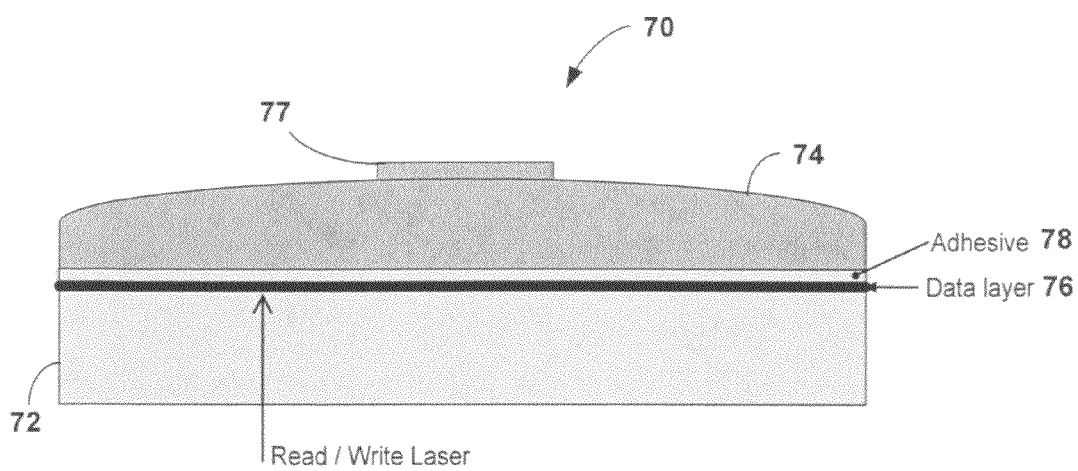
FIG. 7 is a side view of an exemplary optical data storage disk medium consistent with this disclosure.

FIG. 7 is a side view of an exemplary optical data storage medium 70 consistent with this disclosure. Medium 70 may be readable by a conventional DVD drive. As shown, medium 70 comprises a first substrate 72 and a second substrate 74 that are bonded together. A data layer 76 is formed on the first side of first substrate 72 (but could alternatively be formed on the surface of second substrate 74 in a reverse stack configuration). Data layer 76 may comprise replicated features formed on the surface of first substrate 72, e.g., a collection of pits and grooves formed in a concentric or spiral pattern. Data layer 76 may also comprise one or more deposited materials, such as reflectors, phase change materials, dyes, or other information layers commonly used in optical disc media constructions. An adhesive 78 bonds first substrate 72 to second substrate 74. As shown, a read/write laser passes through first substrate 72 to interrogate data layer 76.

In this example, second substrate 74 has a varying thickness profile, e.g., less than 0.6 millimeters with a thin portion at the outer perimeter that gets thicker near the inner diameter. The thickness reduction may provide added savings in raw materials. A clamping zone 77 is located near the inner diameter of medium 70. Clamping zone 77 may comprise a ring, a set of bumps, or other features that increase the thickness of second substrate 74 to approximately 0.6 millimeters in that specific zone in order to provide thickness compliance for DVD drives that clamp the disk at the inner diameter.

Furthermore, the reduced thickness profile of second substrate 74 may be defined to compensate for differences in tensile stress, molding shrinkage, flexure or water absorption between first substrate 72 and second substrate 74.

A conventional optical grade polycarbonate substrate may be used as first substrate 72. In contrast, second substrate 74 may comprise an alternative thermoplastic material that may comprise a non-conventional, non-optical grade polymer, such as industrial grade polycarbonate or another material discussed herein. Since different materials are used for first and second substrates 72 and 74, different thickness profiles may be defined over the major surfaces of substrates 72 and 74 to compensate for imbalances in stress, shrinkage, flexure or water absorption. It may be desirable, for example, to make one or more of these factors align between the two substrates at the substrate interface to within approximately 20 percent, within approximately 10 percent, or within approximately 5 percent, and thickness changes may be used to accomplish this goal.

As with the other examples herein, second substrate 74 may comprise post-consumer recycled material, such as recycled polycarbonate obtained from old optical data storage disks, or recycled polycarbonate obtained from another source. In other examples, second substrate 74 may comprise blends of polycarbonate with other polymer materials, such as blends of ABS and polycarbonate, or blends of polyester and polycarbonate. In some cases, some or all of the materials or material blends may comprise post-consumer recycled material, which leads to a more environmentally friendly optical data storage medium.

Various characteristics of second substrate 74 may be aligned or matched with those of first substrate 72. For example, a coefficient of thermal expansion of second substrate 74 may be within approximately 15 percent, within approximately 10 percent, within approximately 5 percent or within approximately 2 percent of a coefficient of thermal expansion of first substrate 72. Also, water permeability of second substrate 74 may be within approximately 15 percent, within approximately 10 percent, within approximately 5 percent or within approximately 2 percent of the water permeability of first substrate 72. In addition, the tensile modulus, flexure modulus, and/or Young's modulus of second substrate 74 may be within approximately 15 percent, within approximately 10 percent, within approximately 5 percent or within approximately 2 percent of that of first substrate 72. Depending on the materials used for first substrate 72 and second substrate 74, the thickness profile of second substrate 74 may be defined relative to that of first substrate 72 to achieve these matching characteristics.

Figure 8:
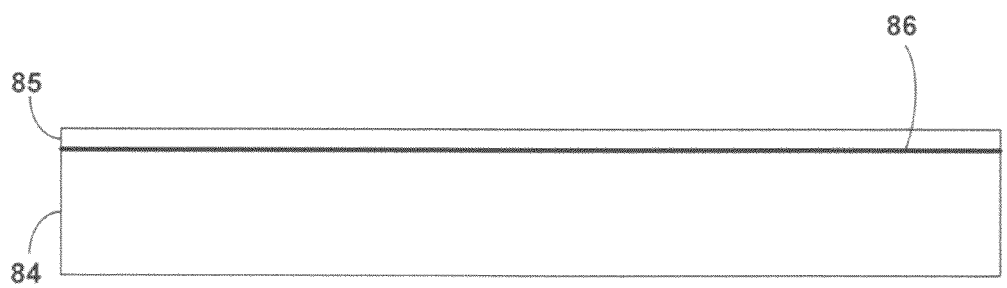
FIG. 8 is a side view of an added embodiment of an exemplary optical data storage disk medium compliant with a Blu-ray standard and consistent with this disclosure.

FIG. 8 is a side view of an added embodiment of an exemplary optical data storage disk medium compliant with a Blu-ray standard and consistent with this disclosure. In this example, substrate 84 is formed with a Blu-ray compliant data layer 86, which may include multiple sub-layers and various deposited materials, reflectors or partial reflectors. A Blu-ray compliant cover layer 85 is formed over data layer. Cover layer 85 may comprise a high-quality optical grade polycarbonate, or possibly a spin-coated polymer layer. In accordance with this disclosure, Blu-ray compliant medium 80 may comprise a low-grade substrate 84 formed of one or more of the materials described herein. Substrate 84 may define a thickness of approximately 1.1 millimeters and cover layer 85 may define a thickness of approximately 0.1 millimeters.

In accordance with this disclosure, substrate 84 may comprise post-consumer recycled material, such as recycled polycarbonate obtained from old optical data storage disks, or recycled polycarbonate obtained from another source. In other examples, substrate 84 may comprise blends of polycarbonate with other polymer materials, such as blends of ABS and polycarbonate, or blends of polyester and polycarbonate, such as blends of polycarbonate and PET or blends of polycarbonate and PBT. In some cases, some or all of the materials or material blends may comprise post-consumer recycled material, which leads to a more environmentally friendly optical data storage medium.

Optical data storage medium 80 may be compliant with a Blu-ray standard, and may comprise a substrate 84 defining a first side and a second side, wherein the first side defines a data layer 86, and wherein the substrate comprises post-consumer recycled material. Optical data storage medium 80 may further comprise a cover layer 85 formed over the data surface. Cover layer 85 may comprise a high quality polycarbonate substrate of approximately 0.1 millimeters, or may comprise a spin coated polymer that meets the optical requirements of the Blu-ray standard. Substrate 84 may comprise a 1.1 millimeter substrate formed of the materials described herein. Data layer 86 may comprise a collection of pits and grooves formed in substrate 84, as well as deposited materials, such as reflectors, phase change materials, dyes, or other materials to provide a data surface compliant with the Blu-ray standard.

Various embodiments have been described. These and other embodiments are within the scope of the following claims.

The invention claimed is:

1. An optical data storage medium compatible with a digital versatile disk (DVD) drive, the medium comprising:
   a first disk-shaped substrate comprising an optical grade thermoplastic material, the first disk-shaped substrate defining a first side and a second side, wherein the first side defines a data surface, wherein a laser of the DVD drive reads information associated with the data surface by interrogating light through the first disk-shaped substrate; and
   a second disk-shaped substrate defining a first side and a second side, wherein the second side of the second disk-shaped substrate is bonded to the first side of the first disk-shaped substrate, and wherein the second disk-shaped substrate comprises a non-optical grade thermoplastic material.

2. The optical data storage medium of claim 1, wherein the first disk-shaped substrate comprises an optical grade polycarbonate.

3. The optical data storage medium of claim 1, wherein the non-optical grade thermoplastic material comprises a non-optical grade polycarbonate.

4. The optical data storage medium of claim 1, wherein the non-optical grade thermoplastic material comprises a recycled material.

5. The optical data storage medium of claim 1, wherein the non-optical grade thermoplastic material comprises an acrylonitrile butadiene styrene (ABS).

6. The optical data storage medium of claim 1, wherein the non-optical grade thermoplastic material comprises a blend of acrylonitrile butadiene styrene (ABS) and polycarbonate.

7. The optical data storage medium of claim 1, wherein the non-optical grade thermoplastic material comprises a polyester.

8. The optical data storage medium of claim 1, wherein the non-optical grade thermoplastic material comprises a blend of polyester and polycarbonate.

9. The optical data storage medium of claim 1, wherein the first disk-shaped substrate defines a flat cross-sectional profile and a thickness of approximately 0.6 millimeters, and wherein the second disk-shaped substrate defines non-flat cross-sectional profile.

10. The optical data storage medium of claim 1, wherein the cross-sectional profile of the second disk-shaped substrate is defined to substantially balance mechanical stress at a bonded interface between the first disk-shaped substrate and the second disk-shaped substrate.

11. The optical data storage medium of claim 1, wherein a coefficient of thermal expansion of the second disk-shaped substrate is within approximately 10 percent of a coefficient of thermal expansion of the first disk-shaped substrate.

12. The optical data storage medium of claim 1, wherein water permeability of the second disk-shaped substrate is within approximately 10 percent of water permeability of the first disk-shaped substrate.

13. The optical data storage medium of claim 1, wherein a tensile modulus of the second disk-shaped substrate is within approximately 10 percent of a tensile modulus of the first disk-shaped substrate.

14. The optical data storage medium of claim 1, wherein a flexure modulus of the second disk-shaped substrate is within approximately 10 percent of a flexure modulus of the first disk-shaped substrate.

15. The optical data storage medium of claim 1, wherein a Young's modulus of the second disk-shaped substrate is within approximately 10 percent of a Young's modulus of the first disk-shaped substrate.

16. An optical data storage medium compatible with a digital versatile disk (DVD) drive, the medium comprising:
   a first disk-shaped substrate comprising an optical grade thermoplastic material, the first disk-shaped substrate defining a first side and a second side; and
   a second disk-shaped substrate defining a first side and a second side, wherein the second side of the second disk-shaped substrate is bonded to the first side of the first disk-shaped substrate, wherein the second side of the second disk-shaped substrate defines a data surface and wherein a laser of the DVD drive reads information associated with the data surface by interrogating light through the first disk-shaped substrate, and wherein the second disk-shaped substrate comprises a non-optical grade thermoplastic material.

17. The optical data storage medium of claim 16, wherein the first disk-shaped substrate comprises an optical grade polycarbonate.

18. The optical data storage medium of claim 16, wherein the non-optical grade thermoplastic material comprises a non-optical grade polycarbonate.

19. The optical data storage medium of claim 16, wherein the non-optical grade thermoplastic material comprises a recycled material.

20. The optical data storage medium of claim 16, wherein the non-optical grade thermoplastic material comprises an acrylonitrile butadiene styrene (ABS).

21. The optical data storage medium of claim 16, wherein the non-optical grade thermoplastic material comprises a blend of acrylonitrile butadiene styrene (ABS) and polycarbonate.

22. The optical data storage medium of claim 16, wherein the non-optical grade thermoplastic material comprises a polyester.

23. The optical data storage medium of claim 16, wherein the non-optical grade thermoplastic material comprises a blend of polyester and polycarbonate.

24. The optical data storage medium of claim 16, wherein the first disk-shaped substrate defines a flat cross-sectional profile and a thickness of approximately 0.6 millimeters, and wherein the second disk-shaped substrate defines non-flat cross-sectional profile.

25. The optical data storage medium of claim 16, wherein the cross-sectional profile of the second disk-shaped substrate is defined to substantially balance mechanical stress at a bonded interface between the first disk-shaped substrate and the second disk-shaped substrate.

26. The optical data storage medium of claim 16, wherein a coefficient of thermal expansion of the second disk-shaped substrate is within approximately 10 percent of a coefficient of thermal expansion of the first disk-shaped substrate.

27. The optical data storage medium of claim 16, wherein water permeability of the second disk-shaped substrate is within approximately 10 percent of water permeability of the first disk-shaped substrate.

28. The optical data storage medium of claim 16, wherein a tensile modulus of the second disk-shaped substrate is within approximately 10 percent of a tensile modulus of the first disk-shaped substrate.

29. The optical data storage medium of claim 16, wherein a flexure modulus of the second disk-shaped substrate is within approximately 10 percent of a flexure modulus of the first disk-shaped substrate.

30. The optical data storage medium of claim 16, wherein a Young's modulus of the second disk-shaped substrate is within approximately 10 percent of a Young's modulus of the first disk-shaped substrate.

31. An optical data storage medium compatible with a Blu-ray standard, the medium comprising:

a substrate defining a first side and a second side, wherein the first side defines a data surface, and wherein the substrate comprises a non-optical grade, post-consumer recycled material; and a cover layer formed over the data surface.

32. The optical data storage medium of claim 31, wherein the non-optical grade, post-consumer recycled material comprises recycled polycarbonate.

33. The optical data storage medium of claim 1, wherein the non-optical grade thermoplastic material comprises at least one of a non-optical grade polycarbonate, a non-optical grade recycled material, a non-optical grade blend of acrylonitrile butadiene styrene (ABS) and polycarbonate, a non-optical grade polyester, and a non-optical grade blend of polyester and polycarbonate.

34. The optical data storage medium of claim 16, wherein the non-optical grade thermoplastic material comprises at least one of a non-optical grade polycarbonate, a non-optical grade recycled material, a non-optical grade blend of acrylonitrile butadiene styrene (ABS) and polycarbonate, a non-optical grade polyester, and a non-optical grade blend of polyester and polycarbonate.

* * * * *